Figure 8:
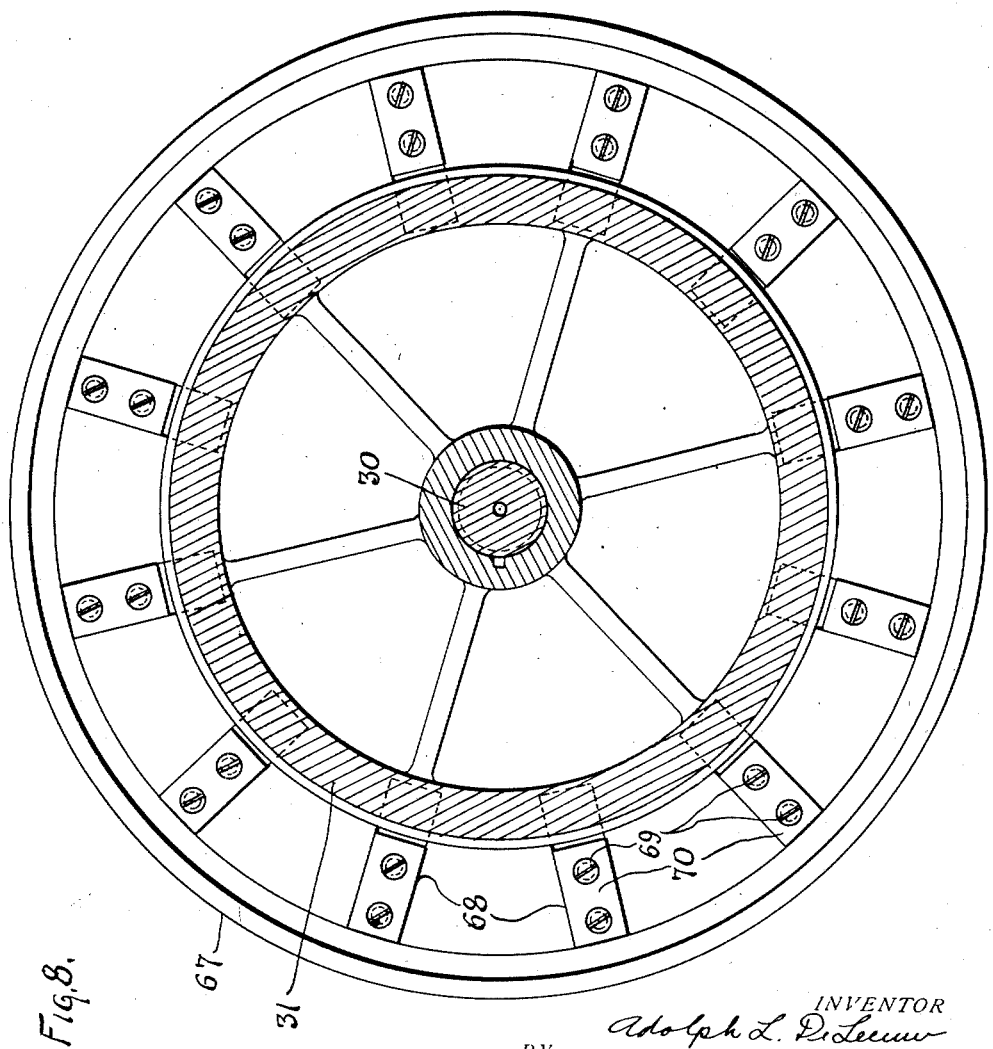

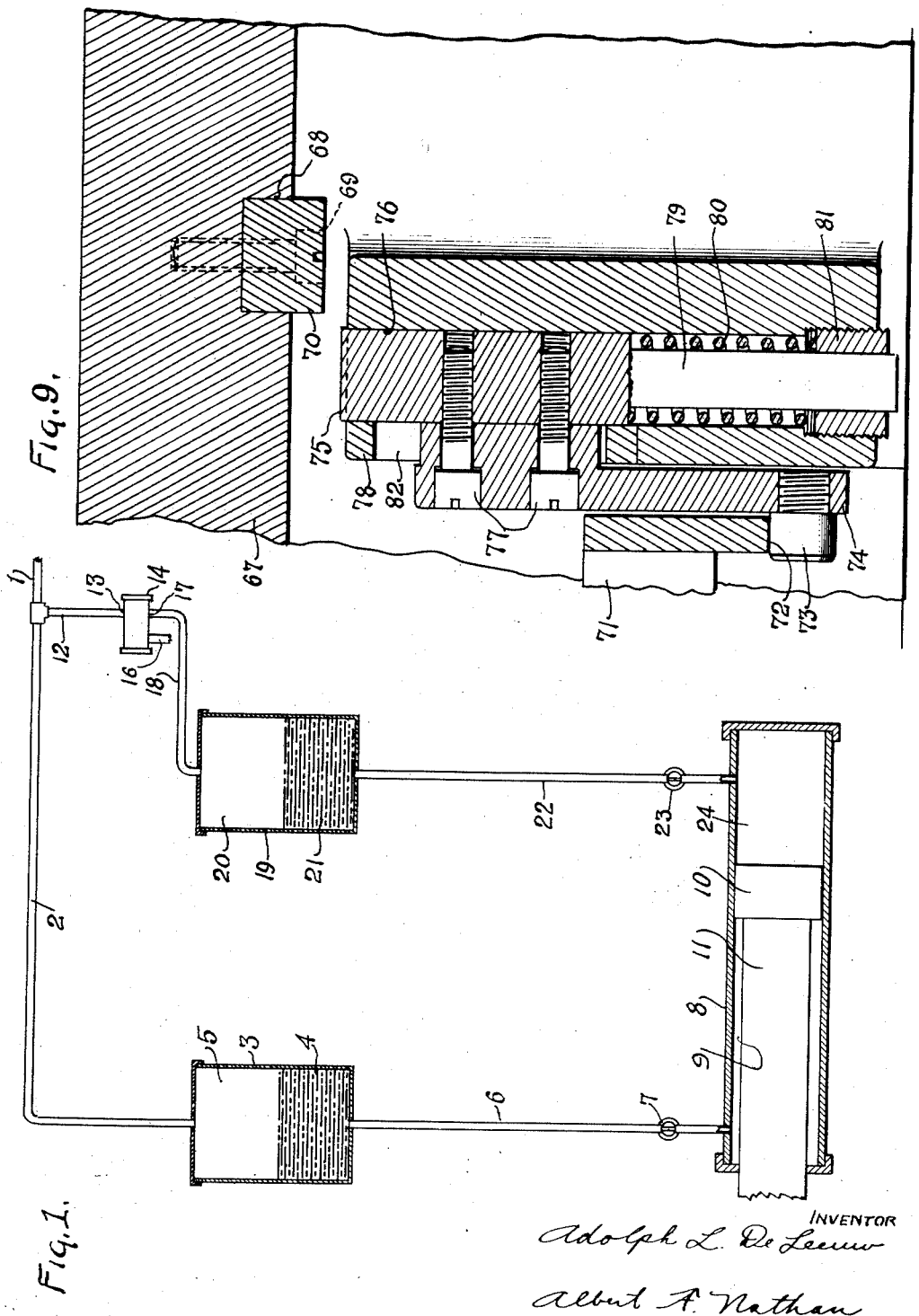

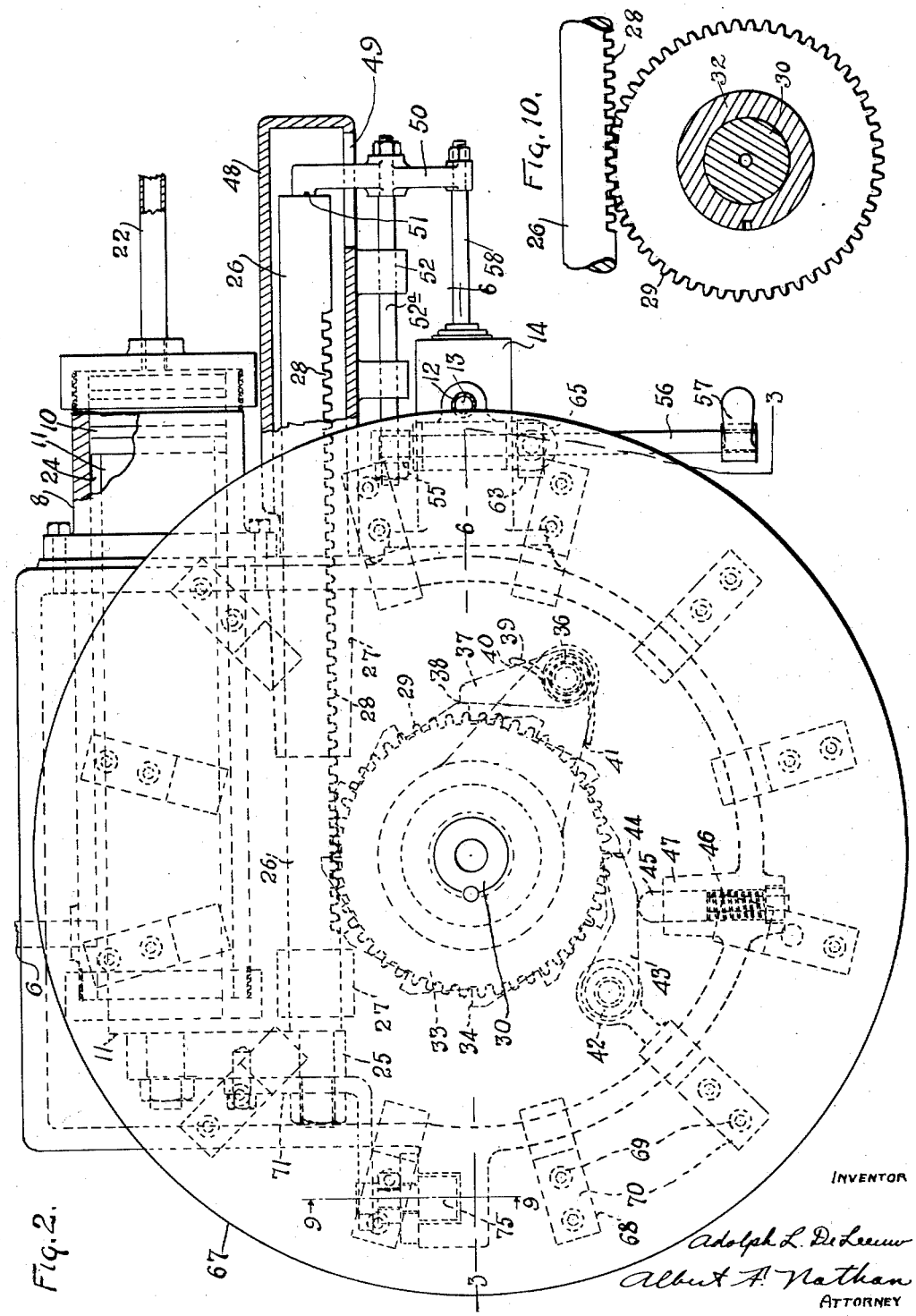

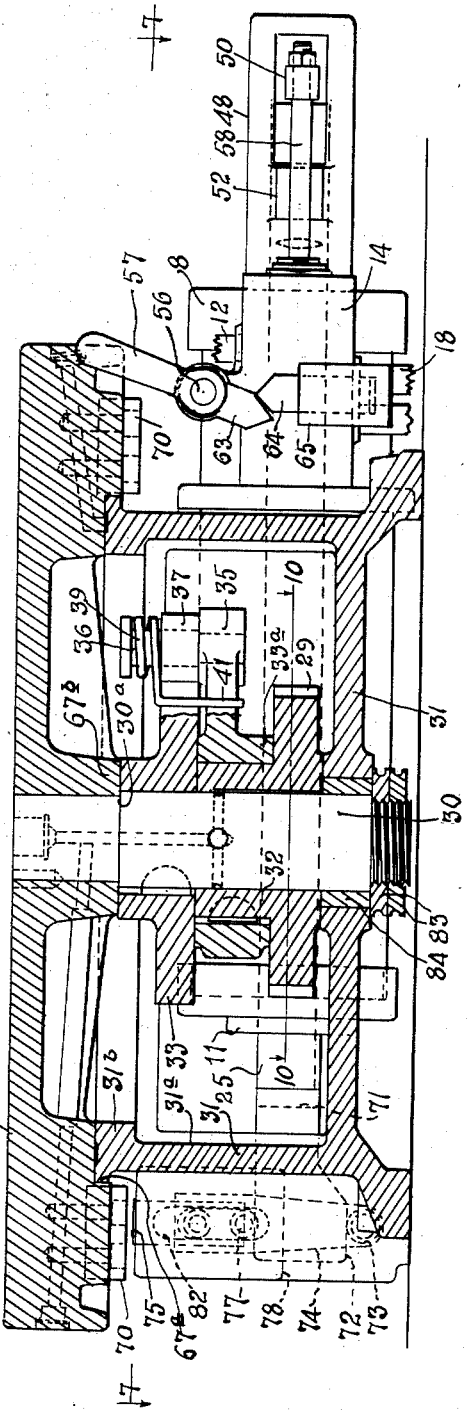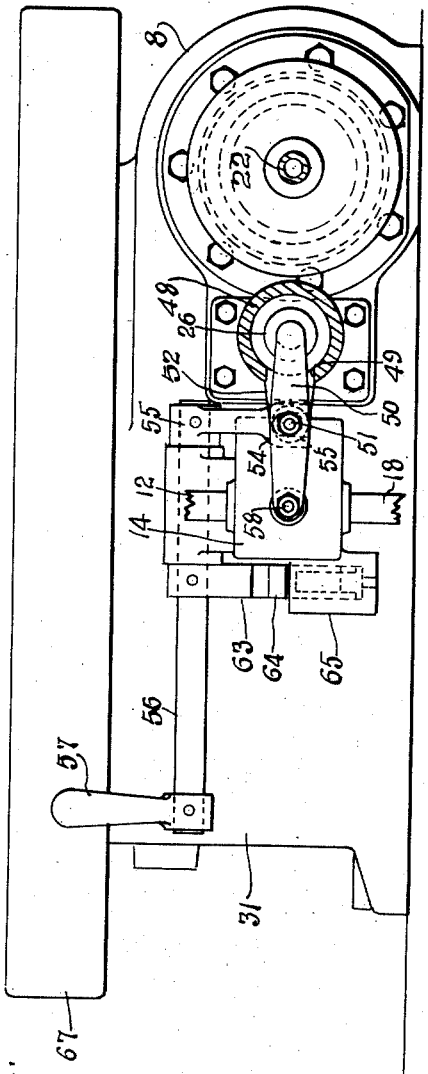

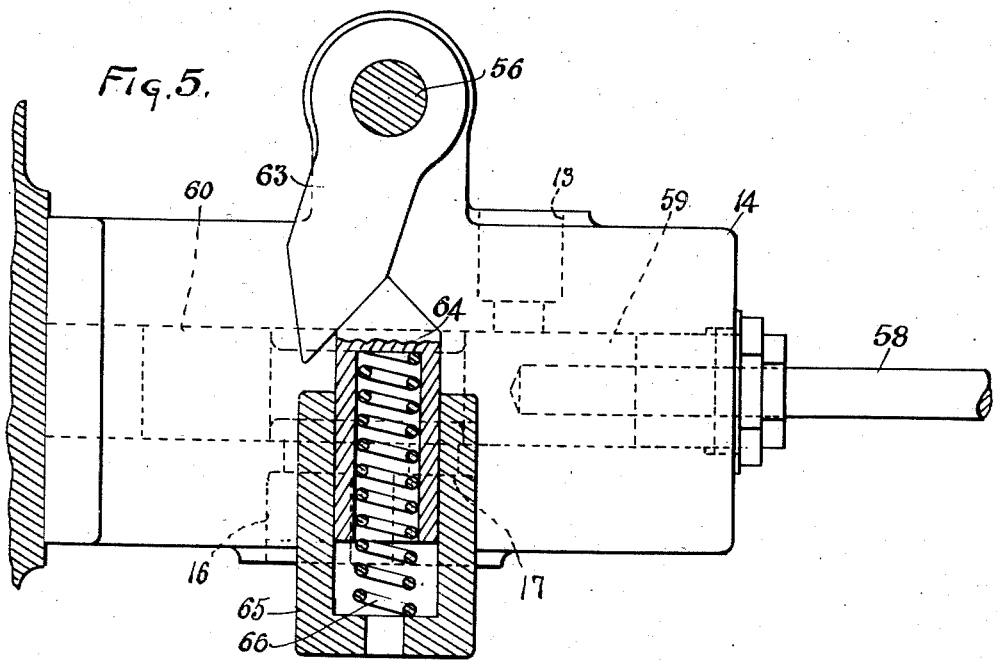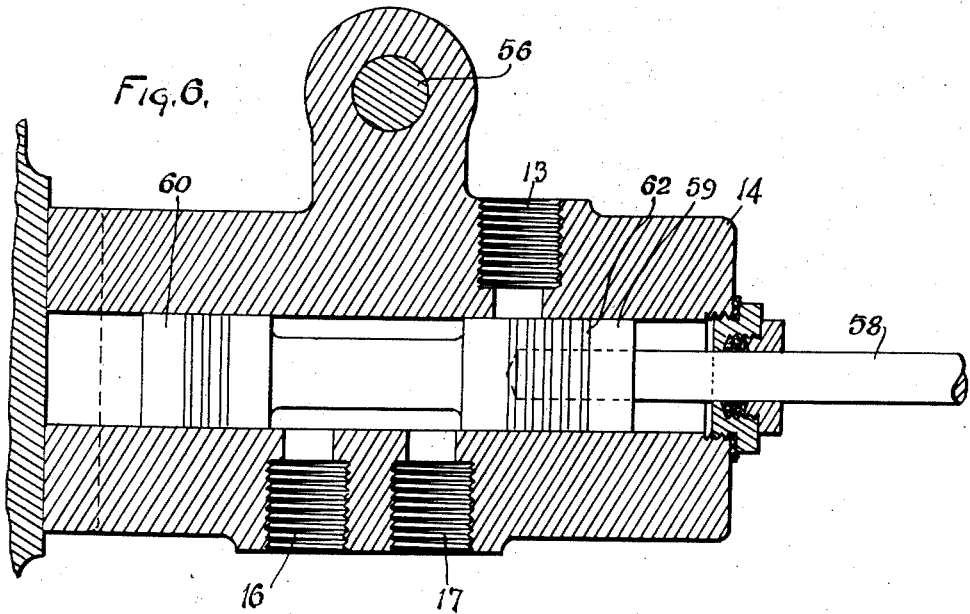

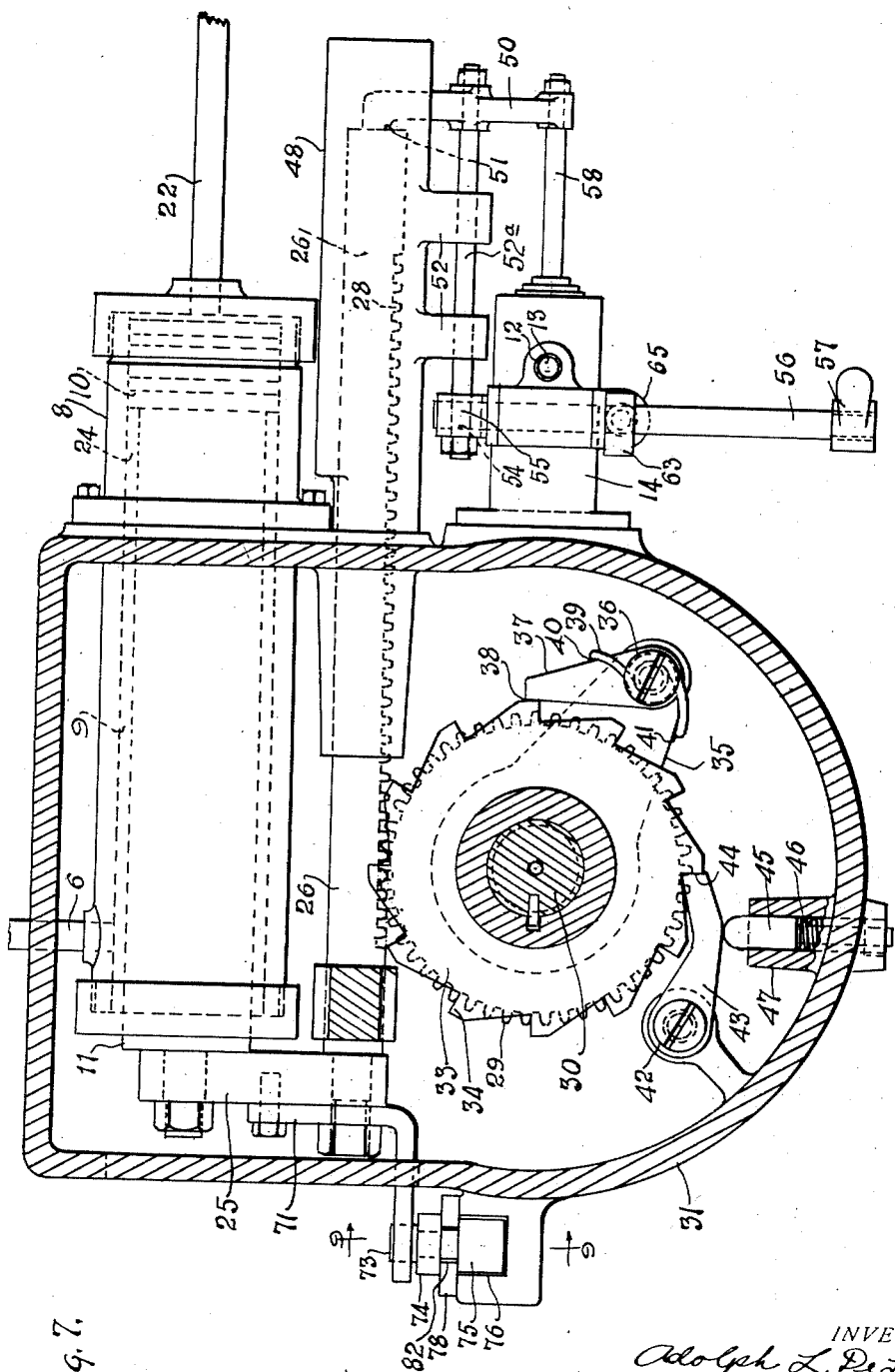

April 30, 1929. A. L. DE LEEUW 1,710,865
PRESSURE FLUID ACTUATED INDEXING MECHANISM
Filed Dec. 4, 1926  6 Sheets-Sheet 6

INVENTOR
Adolph L. DeLeeuw
BY Albert F. Nathan
ATTORNEY

Patented Apr. 30, 1929.

1,710,865

UNITED STATES PATENT OFFICE.

ADOLPH L. DE LEEUW, OF PLAINFIELD, NEW JERSEY.

PRESSURE-FLUID-ACTUATED INDEXING MECHANISM.

Application filed December 4, 1926. Serial No. 152,680.

The invention comprises primarily a means for actuating a machine tool by fluid pressure. Such means are in general well known and various adaptations have been made. In such previous adaptations the pressure fluid has been in some cases an elastic fluid, such as air; and in others an hydraulic fluid, such as oil.

Each of these had certain disadvantages; the air e. g. was too easily compressed or did not have sufficient inertia to provide a steady motion while the oil was often too positive in its action and required the use of pumps and related mechanism for furnishing a continuous supply. A well known means of utilizing these pressure fluids was in a cylinder having therein a differential piston. The pressure fluid was usually applied constantly to the piston face of smaller area tending to move it in one direction and hold it at one end of its stroke. Operation was obtained by the intermittent application of the pressure fluid to the piston face having the larger area.

One of the objects of this invention is the utilization of both an elastic fluid and an inelastic fluid for operating a machine tool whereby many of the objectionable features of a single fluid, some of which are mentioned above, are eliminated or diminished in their effect. The hydraulic fluid is always in contact with the piston means and oscillations back and forth in accordance with the reciprocatory motion of the piston. Pressure is applied to the hydraulic fluid by means of the elastic fluid. The advantages of hydraulic operation are thus obtained without the use of pumps and related transmission lines and mechanism. Reservoirs are provided in the lines which are partly filled with the hydraulic fluid and partly with the gas. The reservoirs provide means to take care of the fluctuations in the hydraulic fluid as it oscillates back and forth. A smooth steady hydraulic power transmission is thus obtained without the necessity of overcoming the inertia and moving an unduly large amount of liquid. The primary operating force is the elastic fluid which is admitted to and exhausted from one or both reservoirs.

It is one of the objects of this invention to apply and adapt this novel fluid pressure means to the operation of an indexing mechanism. Such mechanisms usually comprise in general a rotatable head or turret in which are placed a plurality of means for holding tools or for holding stock to be machined. An opposed head holds either the stock or the tool as the case may be. Successive partial rotations of the turret bring the stock into proper relation with the desired tool and in the desired sequence. An ordinary piston operating a rack and ratchet mechanism for rotating said turret is old in the art. Such means however have proven objectionable in that since considerable gearing is required for operating the turret through the ratchet mechanism a large amount of play is often present especially after the parts become a little worn. This play is greater than in other machine tools as e. g. a shaper where the piston may be connected directly to the reciprocatory table requiring but little if any intermediate gearing. This invention has for one of its objects the adaptation of the differential piston to the operation of such an indexing mechanism. By the application of a constant pressure to the smaller piston face whereby the piston is constantly urged in one direction the piston necessarily moves over until it meets with a stronger resisting force thereby taking up all play in the intermediate gearing. Fluid pressure means have also been employed for operating stop means and for locking the turret of an index head in working positions. Such means have heretofore comprised a plurality of mechanisms and pistons which necessarily complicated the device as a whole and rendered it less accurate and reliable. It is an object of the present invention to simplify such stop and locking means. In the device disclosed herein the pressure fluid is admitted to the larger piston face moving the piston and through its connected gearing rotating the turret until it engages a positive stop. The pressure is not relieved then but is maintained to hold the turret in that position until it is desired to give the turret its next movement. Thus, the operating piston is also used to hold the turret in its successive positions. Such means allows of an extremely accurate positioning of the turret and of positively maintaining that position. The inaccuracies due to wear of locking means such as latches are practically eliminated.

The application of the fluid actuating means to the operation of an indexing mechanism results in a machine which is very much simplified in construction, has a smooth steady operation free from jerking motions and from the back lash found in mechanical connections. The fluid pressure means disclosed provides a firm, strong source of power but one which will yield to a positive mechanical stop thereby often preventing broken parts.

The invention also contemplates the use of fluid pressure control means which are peculiarly adapted to the indexing mechanism, and which are reliable and easy of operation.

Other objects and advantages will be in part indicated in the following description and in part rendered apparent therefrom in connection with the annexed drawings.

To enable others skilled in the art so fully to apprehend the underlying features hereof that they may embody the same in the various ways contemplated by this invention, drawings depicting a preferred typical construction have been annexed as a part of this disclosure and, in such drawings, like characters of reference denote corresponding parts throughout all the views, of which :—

In the accompanying drawings Figure 1 is a diagrammatic view showing the application of pressure fluid including the hydraulic medium to the motor part of the actuating means. Fig. 2 is a plan view showing the mechanism applied to an index table. Fig. 3 is a section on the line 3—3 of Fig. 2. Fig. 4 is an end elevation looking from the right hand side of Fig. 2 and with the rack housing in cross section. Fig. 5 is a detail view of the carry-on and retaining means. Fig. 6 is a section on the line 6—6 of Fig. 2 showing the details of the control valve. Fig. 7 is a section on the line 7—7 of Fig. 3 looking in the direction of the arrows. Fig. 8 is a bottom plan view of the index table showing the arrangements of stop blocks thereon. Fig. 9 is a detail view partly in section of the stop pin mechanism taken on the line 9—9 of Fig. 2. Fig. 10 is a detail view along section line 10—10 of Fig. 3 of the rack and gear operated thereby.

The description will relate first to the fluid pressure means and then to its novel application to an indexing mechanism.

Referring to Fig. 1 a pipe 1 indicates a source of elastic fluid under pressure such as air or steam. This pressure fluid is led through pipe 2 to reservoir 3. The reservoir is partly filled with a hydraulic fluid such as, for example, oil 4 leaving a space 5 at the top thereof for the elastic fluid. Pipe 1 is also connected through pipe 12 with valve casing 14 having the inlet 13, outlet to the atmosphere 16 and connection 17 through the pipe 18 with the reservoir 19. This reservoir, similar to the other one, may be partly filled with liquid 21 having a space for gas 20 at the top thereof. Reservoir 3 is connected through pipe 6 having needle valve 7 therein with one end of the cylinder 8 having a differential piston 10 therein. The amount of differential pressure on the piston 10 may be determined by the size of the projecting portion 11. Reservoir 19 is connected through pipe 22 having needle valve 23 therein, with the chamber 24 in the cylinder 8.

The connections shown furnish a flexible hydraulic means for operating the indexing mechanism without requiring the use of pumps and related mechanism. It may be seen that as the piston is caused to move in one direction or the other the liquid displaced is taken care of by the reservoirs in which the variation in height is relatively small. Such means reduces the pipe friction which would result if the power were furnished directly through a hydraulic fluid system with its accompanying pipes and pumps.

The tank 3 may or may not be in constant communication with the source of elastic fluid. The fluid in chamber 9 upon returning to the tank 3 merely compressing the gas in the upper part thereof in case pipe 2 is closed.

The operation takes place by the admission and exhaust of the elastic fluid through the valve casing 14 thereby practically eliminating the loss of any hydraulic fluid.

It can be readily seen that the speed of the movement of the piston 10 in either direction can be varied by varying the amount of opening of either valve 7 or 23 or both. Also it is observed that by placing these valves in the liquid line a more accurate control may be obtained than if such valves were located in the path of a compressible fluid such as air or stream.

The piston rod 11 is rigidly connected to the cross connecting bar 25, the opposite end of the cross bar 25 being rigidly connected to rack 26 working in guides 27 and having thereon teeth 28 meshing with the gear 29.

The vertical shaft 30 is centrally mounted in the main casing and supporting frame 31. The gear 29 is provided with a sleeve 32 upon which is supported the ratchet wheel 33 having teeth 34, the ratchet wheel 33 being keyed to shaft 30. The sleeve 33$^a$ keyed to the outside of sleeve 32 carries a projecting arm 35 upon which arm is a pin 36 forming a support for the pawl 37 having nose 38 engaging with the teeth of the ratchet wheel. The pawl is maintained in engagement with the ratchet wheel by means of coil spring 39, one end of which spring bears at 40 against the pawl and the other end of which bears against the arm 35 at 41. Reverse rotation of the ratchet wheel is prevented by pawl 43 pivoted at 42 and having a nose 44 bearing against the ratchet wheel. A pin 45 and spring 46 slidably mounted in boss 47 maintain the pawl in engagement with the ratchet wheel.

Referring to Fig. 2 it will be seen that rack 26 projects to the right into a tubular housing 48 having therein a rectangular opening 49 through which projects a connecting bar 50. The bar 50 has a surface 51 which, at certain times in the operation, is engaged by the rack 26. Rigidly connected to the bar 50 is a rod 52ª slidably connected in guides 52. A nut 53 (see Fig. 7) on the bar 52ª provides an annular shoulder against which forks 44 of the arms 55 may engage to shift bar 52ª and its connecting mechanism. The forked arm 55 is rigidly mounted on control shaft 56 having at its other end control handle 57.

The valve rod 58 also rigidly connected with arm 50 has thereon piston heads 59 and 60 slidably mounted in the valve casing 14.

Depending from the control rod 56 is an arm 63 carrying at its lower end V-shaped cam surface which engages with a similar cam on the plunger 64 slidably mounted in the casing 65 and normally forced upwardly by spring 66. The above described mechanism comprises a carry-on device whereby when the handle 57 is moved beyond its mid-position, the pressure of plunger 64 serves to carry it the remaining angle of its movement without further pressure being exerted on handle 57 and also to maintain the control shafts in one position or the other.

The index table or turret 67 is provided on its under-surface with slots 68 wherein are fastened by means of the screw bolts 69 stop blocks 70. The number and spacing of these blocks may be varied in accordance with the requirements of the particular use to which the index table may be put.

The circular housing 31ª has an upper annular portion 31ᵇ the upper face of which serves as a bearing surface for the index table 67. The outer cylindrical face of the annular portion 31ᵇ likewise serves as a hub bearing for the table.

Rigidly mounted on the cross bar 25 is the right angled bracket 71, one leg of which carries the cam surface 72 for engagement with the roller 73 carried on the vertically movable bar 74 which also has connected thereto the stop pin 75 adapted to project upwardly in the path of the blocks 70 which rotate with the index table 67. The stop pin 75 is slidably mounted in the rectangular slot 76 formed in the main housing 31. Screw bolts 77 rigidly connect the bar 74 to the pin 75. A plate 78 serves as a bearing member for and holds the stop pin 75 in its channel 76. The stop pin has connected thereto a depending cylindrical guide portion 79 surrounded by the spring 80 which normally tends to force the stop pin in the upward direction when the cam 72 in moving to the left (Fig. 3) releases the roller 73. The nut 81 serves as an adjustable spring retainer and as a bearing for the rod 79.

The vertical slot 72 provides for the movement therein of a connecting boss between bar 74 and stop pin 75. The lower end of spindle 30 is provided with lock nuts 83 and with a journal 84.

*Mode of operation.*

The operation of the device is as follows:—

Assuming that the piston 10 occupies some position to the left of that shown with one of the stop blocks 70 firmly pressed against the stop pin 75, the operator moves the handle 57 to the right thereby causing the valve connecting rod 58 to assume the position shown in Fig. 6. In this position the pressure in chamber 24 at the right of piston 10 will be relieved. The pressure therefore which acts continuously on the left side of piston 11 will force the piston 10 to the right until it engages the surface 51 on the bar 50 and thereby through bar 50 and rod 58 returning the piston valve to the opposite position of that shown in Fig. 6, whereby pressure acts through the inlet 13 and outlet 17 to pipe 18 into the chamber 24 causing the piston to move to the left.

It will be observed that when the piston 10 was moved to the right carrying with it rack 26, the gear 29 was caused to rotate in a clockwise direction as shown in Fig. 2. During this movement, however, no movement is imparted to the ratchet wheel by reason of the ratchet 37 sliding over the teeth on the ratchet wheel and the table remains stationary. When, however, the piston 10 moves to the left such ratchet mechanism causes the ratchet wheel 33 and therefore spindle 30 and index table 67 to rotate therewith in a counterclockwise direction as shown in Fig. 2. This rotation will continue until one of the blocks 70 comes in contact with the stop pin 75 which, as the piston 10 has started to move to the left, has released, through rod 11, bar 25, bracket 71, cam 72 and roller 73, the stop pin 75. The amount of movement of the piston 10 to the left is entirely dependent on the position of the stop members 70 on the index table 67.

A complete cycle, therefore, includes a first movement of the piston and rack to the right, during which movement the table remains stationary by reason of the ratchet mechanism and second a movement of the piston and rack to the left which is the working stroke and results in counter-clockwise rotation of the table as viewed in Figs. 2 and 7. The relative action of the stop pin 75 and stop blocks 70 during these two strokes is as follows: As the piston and rack bar in moving to the right approach the end of their stroke the cam 72 (see Fig. 3) engages roller 73 to depress the locking pin 75, further continued movement to the right causes the rack bar 26 to engage cross bar 50 which thru cooperation of the carry-on cam 64 serves to move the valve to its right hand position the pin 75 remaining depressed. In this position of the valve fluid is directed to the right hand end of the cylinder and the piston begins its movement to the left rotating the table counter-clockwise. The cam 72 does not release the locking pin 75 until substantial rotation has taken place. It is to be noted, however, that but slight counter-clockwise rotation of the table need take place before releasing the pin since the pin 75 is ineffective once the forward face of the particular block 70 passes the coacting bearing face of locking pin 75 until the succeeding block 70 engages the locking pin.

When the movement to the left is completed the table is firmly maintained in that position, with one of the blocks 70 bearing against the locking pin 75, due to the piston 10 having a greater area on its right hand side exposed to the pressure of the fluid than the left hand side. Such position will be maintained until lever 57 is again moved to the right. The arrangement thus disclosed forms a compact, simplified construction wherein a single rack bar having the power applied to it serves both to operate the turret and also to hold it in any desired position. The use of fluid pressure means allows of controlling the application of power by control means which are also directly actuated by the single reciprocatory bar, the whole forming a machine tool of simple construction, yet accurate, reliable and positive in its action.

Without further analysis, the foregoing will so fully reveal the gist of this invention that others can, by applying current knowledge, readily adapt it for various utilizations by retaining one or more of the features that, from the standpoint of the prior art, fairly constitute essential characteristics of either the generic or specific aspects of this invention and, therefor, such adaptations should be, and are intended to be, comprehended within the meaning and range of equivalency of the following claims:—

Having thus revealed this invention, I claim as new and desire to secure the following combinations and elements, or equivalents thereof, by Letters Patent of the United States:—

1. In combination, a machine tool; and means for operating said machine tool comprising a cylinder, a piston therein, a reservoir for each end of said cylinder, connections between each reservoir and its respective cylinder end, liquid in said reservoirs and connections, a source of elastic fluid under pressure in constant communication with one of said reservoirs, and control means for alternately admitting and exhausting said elastic fluid to and from the other reservoir, the piston having a side of smaller area being exposed to the constant pressure whereby the piston tends to move in one direction or the other depending upon the position of the control means.

2. A machine tool combining piston means having two exposed faces of unequal area; means connecting said piston means to said machine tool for operating the latter; a reservoir partially filled with an inelastic fluid connected to act on the piston face of smaller area; a source of elastic fluid under pressure in constant communication with said reservoir; a second reservoir partially filled with an inelastic fluid connected to act on the piston face of larger area; and control means for intermittently placing said source of elastic fluid in communication with said second reservoir.

3. A machine tool combining a cylinder, a piston therein, connections to said piston for operating said machine-tool, a reservoir for each cylinder end, connections from each reservoir to its respective cylinder, hydraulic fluid in said reservoirs and connections; a source of elastic fluid under pressure in constant communication with one of said reservoirs; control means for admitting elastic fluid to or permitting exhaust from the other reservoir; and a valve having an adjustable opening in one of said connections whereby the speed of the piston may be controlled.

4. An indexing mechanism combining a rotary table; and hydraulic means for rotating said table and holding it in predetermined positions comprising differential piston means, operative connections between said piston means and table, a hydraulic fluid in contact with said piston means, a source of elastic fluid under pressure, control means and connections for applying said elastic fluid to said hydraulic fluid to actuate said piston means, and a retractable stop for engagement with said table.

5. In a machine tool, piston means having exposed faces of unequal area; a reservoir containing hydraulic fluid and having connections therefor to the piston face of smaller area; a second reservoir containing hydraulic fluid and having connections therefor to the piston face of larger area; a source of pressure fluid in communication with said first named reservoir whereby a constant pressure is maintained on said smaller piston face; a connection from said source of pressure fluid to said second reservoir; means therein for controlling the admission of pressure fluid to said second reservoir whereby the hydraulic fluid acts intermittently on said larger piston face; rack means connected to said piston means; and indexing mechanism connected to be operated by said rack means.

6. In a machine tool, a cylinder; a piston therein; a piston rod connected to said piston and extending through the rear end of said cylinder whereby the exposed faces of said piston are of unequal area; a reservoir connected to each end of said cylinder; liquid in each of said reservoirs and connections; a source of pressure fluid connected to act constantly on the liquid in the reservoir connected to said rear end; valve means for admitting said pressure fluid to act on the liquid in the other reservoir or to open said reservoir to the atmosphere; indexing mechanism connected to said piston rod to be operated thereby; manually operable means connected to said valve means for opening it to the exhaust; and means operable by the movement of said mechanism for moving the valve means to the admission position.

7. In a machine tool, a cylinder having front and rear ends; a piston therein, the rear face of which has a smaller area than the front; a source of fluid under pressure connected to the rear end of said cylinder; mechanism connected to said piston adapted to be moved thereby; a stop on said mechanism; a plunger adapted to engage said stop; a valve means for connecting said front end to said source of pressure fluid or to exhaust whereby when the valve is in the position for admission the piston is caused to move to the rear and said stop mechanism is brought into engagement with said plunger; manually operable means connected to said valve for moving it to the exhaust position whereby the piston moves to the front end; and means on said mechanism operatively connected to withdraw said plunger as said piston moves to the front end.

8. In an indexing mechanism, a rack; a gear operated by said rack; an index-table; ratchet means operatively connecting said gear and table; stops on said table; a plunger arranged to engage said stops; means connected to said rack for operating said plunger; means for operating said rack; control means therefor; means engaged by said rack for operating said control means; and other means independent therefrom for operating said control means.

9. In an indexing mechanism, a rack, fluid pressure means for operating said rack; a gear and ratchet mechanism operated by said rack; a table connected to be rotated in one direction by said ratchet mechanism; stops on said table; a plunger for engaging said stops; and means on said rack to operate said plunger.

10. In an indexing mechanism, a rack; fluid pressure means for operating said rack; a gear and ratchet mechanism operable by said rack; a turret connected to be rotated in one direction by said ratchet mechanism; control valve means for the admission of fluid to said fluid pressure means; means engaged by said rack and connected to move said valve means to one position whereby the rack moves in one direction; and manually operable means for moving said valve means to another position whereby said rack moves in the opposite direction.

11. In an indexing mechanism, a rack; hydraulic operating means therefor; a gear engaging said rack; a turret; ratchet mechanism between said gear and turret whereby said turret is given an indexing motion; control means for said hydraulic means; means engageable by said rack and connected to said control means whereby the hydraulic means is caused to operate the rack in one direction; manually operable means connected to said control means whereby the hydraulic means may be caused to operate the rack in the opposite direction; stops on said turret; a plunger for engaging said stops; and means on said rack for withdrawing said plunger.

12. In an indexing mechanism, a cylinder; a piston therein; fluid pressure means for operating said piston; a control valve therefor; a rack connected to said piston; a bar arranged to be engaged by said rack near the end of one stroke; a connection between said bar and valve whereby movement of the bar moves the valve into one position; and manually operable means having a loose connection with said bar for returning said bar and valve to their original position.

13. In an indexing mechanism, a cylinder; a piston therein; fluid pressure means for operating said piston; a rack connected to said piston; mechanism operated thereby; a control valve for one end of said cylinder; manually operable means for moving said valve to relieve the pressure at one end of said cylinder whereby the piston and rack are caused to move to the forward end; a bar arranged to be engaged by said rack on its forward movement; a connection from said bar to said valve whereby the latter is moved by the movement of said bar to admit fluid to said cylinder and thereby cause the rearward movement of said piston; means for determining the amount of rearward movement and maintaining such position; and a loose connection from said manual means for returning the bar to its original position to be engaged by said rack.

14. A machine tool combining a frame; an actuable member thereon; and fluid pressure means for actuating said member comprising cylinder and piston means, a container for hydraulic fluid having connections to said cylinder and piston means for urging the latter in one direction upon the application of pressure to said fluid, a second container of hydraulic fluid having similar connections for urging said piston means in the opposite direction, a source of elastic fluid under pressure connected to said containers for applying pressure thereto, and valve means for controlling the admission of elastic fluid to one of said containers.

15. A machine tool combining a frame; a member actuable thereon; cylinder and piston means connected to operate said member said piston means having exposed faces of unequal area; a container for hydraulic fluid having fluid connections to said piston face of smaller area; means for maintaining said hydraulic fluid under pressure; a second container for hydraulic fluid connected to said piston face of larger area; a source of elastic fluid under pressure; and means for selectively admitting elastic fluid therefrom to act on the hydraulic fluid in said second container.

16. An indexing mechanism combining, a rotary head; a rotary member concentric therewith; a one way clutch connecting said rotary member to said head; a releasable stop member for positioning said head in predetermined positions; fluid pressure operating means for rotating said rotary member in the clutch engaging direction to actuate said head into engagement with said stop member and operative to hold it in such position until released for the next indexing movement.

17. An indexing mechanism combining a rotary head; stop means adapted to engage said head to hold it in predetermined positions; fluid actuating means for rotating said head and for holding it in engagement with said stop means; a control valve; means for actuating said valve to one position; a reciprocable member forming part of said actuating means; means engaged thereby for releasing said stop member; and means also engaged by said reciprocable member for returning said valve to its first position.

18. A machine tool combining a rotary head; stop means adapted to engage said head to hold it in predetermined positions; fluid actuating means for rotating said head and for holding it in engagement with said stop means; and control means therefor comprising a valve, manually operable means for actuating said valve to one position to permit exhaust from said fluid means, means engaged by said actuating means to return said valve whereby fluid is readmitted to said actuating means to rotate the head and hold it in engagement with said stop means.

19. Fluid actuating means for indexing mechanism combining an oscillatory driving member; fluid actuated piston means; rack means adapted to be reciprocated by said piston means; operative connections between said rack means and driving member; a control valve movable into inlet and exhaust positions; means engaged by said rack means for moving said valve into one of said positions; and other means for moving said valve into the other position.

20. An indexing mechanism for machine tools combining a rotary mainshaft; fluid actuated mechanism having operative connections for imparting an indexing movement thereto; and control means therefor comprising a valve movable into inlet and exhaust positions, an element projecting therefrom, an arm mounted for oscillatory movement and having a lost motion connection with element, carry over mechanism for releasably causing said arm and valve to assume either one of said positions, means for moving said arm in one direction, and other means adapted to be engaged by said fluid actuated mechanism for moving said arm in the opposite direction.

21. A machine tool combining a rotary mainshaft; a driving element rotatively mounted thereon; clutch means connecting said driving element to said shaft; fluid actuated piston means having operating connections to said driving element for oscillating the latter; a control valve for said fluid means movable into two operative positions; and operating means for said control valve comprising, means for moving said valve in one direction, means engaged by said operating connections to move said valve in the opposite direction, and carry-over mechanism for releasably causing said valve to assume either of said operative positions.

22. A machine tool combining a rotatably mounted head; a fluid cylinder; a piston therein; means including a one way clutch connecting said piston to said head whereby an indexing movement is imparted thereto by the forward and backward movement of said piston; positive stop means for holding said head in predetermined indexed positions; valve means for said cylinder; means for manually positioning said valve means to cause said piston to move on its backward stroke; and means automatically operable on the backward stroke of said piston to position said valve means to cause said piston to move on its forward stroke and thereby rotate said table into engagement with said positive stop means, the valve means remaining in the latter position whereby the piston holds the table in engagement with said positive stop means until the valve is again manually moved.

In witness whereof, I have hereunto subscribed my name.

ADOLPH L. DE LEEUW.